Nov. 26, 1929.　　　　　　　　　　　　　　　　　1,737,207
V. TAUFFENBACH, NÉE WALLER ET AL
VEHICLE SPRING PROTECTION
Filed Aug. 8, 1927
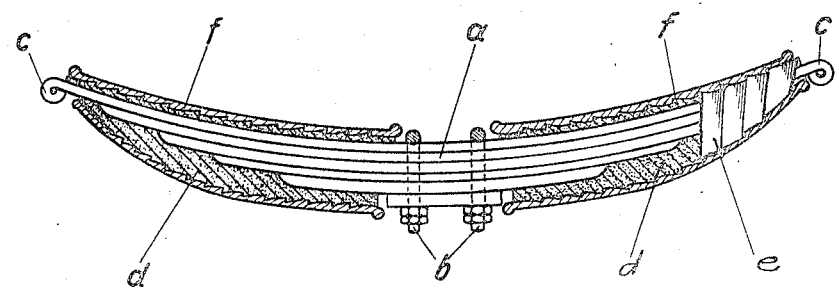
Inventors:
Valerie Tauffenbach née Waller
and Karl Greiner.
by [signature]
Atty.

Patented Nov. 26, 1929

1,737,207

UNITED STATES PATENT OFFICE

VALERIE TAUFFENBACH, NÉE WALLER, OF BERLIN-CHARLOTTENBURG, AND CARL GREINER, OF BERLIN-HALENSEE, GERMANY, ASSIGNORS TO "TACO" KRAFT-FAHRZEUG-WERKSTATTEN G. M. B. H., OF BERLIN-CHARLOTTENBURG, GERMANY, A FIRM

VEHICLE SPRING PROTECTION

Application filed August 8, 1927, Serial No. 211,535, and in Germany October 29, 1926.

Our invention refers to vehicle spring protection and more especially to means whereby vehicle springs, such as for instance the laminated springs inserted between the chassis and body of the motor car, are protected against the mechanical and chemical influences of moisture and dirt. It is an object of our invention to provide means of the kind aforesaid which are more reliable in action than those hitherto known and will afford protection of almost infinite duration.

It is well known that although lubricant is applied to the single parts of the laminated vehicle springs when mounting same in position, such springs will rust after a comparatively short time amounting in some cases to a few weeks only. This drawback is caused by the fact that the springs being severely strained during use are forced apart by the shocks imparted to them so that rain and other water is splashed between them and will form together with the moisture from the air an emulsion with the lubricant covering the surfaces of the single parts of the springs. This emulsion will be further diluted in proportion to further quantities of moisture taken up from the air and in comparatively short time the emulsion formed will contain so much moisture that rusting is inevitable, which causes the action of the springs to be influenced and the springs to break easily.

We are aware that it has already been suggested to protect the springs by mounting thereon protecting sleeves consisting of coverings, mostly leather coverings, which are mounted in place on the springs after these springs have been secured on the chassis, the sleeves then being fixed by means of straps, press-buttons or the like. It is, however, well known, that these sleeves do not form a water-tight or air-tight covering and are not capable of preventing the access of comparatively great quantities of moisture to the springs so that practically speaking these sleeves are of no value at all, the springs rusting all the same.

Our invention is adapted to avoid these drawbacks altogether by providing an absolutely air-tight and water-tight envelope surrounding the spring on all sides, this envelope consisting of a water-repellant, permanently deformable insulating mass, for instance paraffine and the like, in which the spring is embedded and which is in its turn enclosed in a well known coil consisting of rubber or a similar material.

The insulating mass, in which the spring is embedded, must be so constituted as to closely apply itself to the spring and to seal all the air spaces, while being strong enough to tightly grip the grip and to allow the hose-like rubber envelope or the like to be placed thereon and to grip it tightly.

In the drawings affixed to this specification and forming part thereof a spring and protecting means embodying our invention are illustrated in diagrammatic section by way of example.

In the drawings $a$ is a laminated vehicle spring, $b$, $b$ are the stirrups and $c$, $c$ are the ends of the uppermost spring leaf. The parts of the spring extending between the stirrups and the ends are enclosed in an air and water-tight packing $d$ consisting of paraffine, mineral wax or some other water repellant and air-tight permanently deformable material or a mixture of such materials. In the drawing the packing $d$ is shown on an exaggerated scale for the sake of clearness and in reality the layer of paraffine or other packing material will be much thinner. If desired, textile matter may be inserted in the layer $d$ of paraffine or the like in order to reinforce same, for instance in such manner that around the layer $d$ enclosing the spring is wound a bandage, indicated at $e$, impregnated with paraffine. On this bandage or a further layer of insulating mass covering same is mounted a tubular sleeve $f$ consisting of rubber or some other suitable material, the diameter of the sleeve being such that in consequence of its own elasticity it will apply itself tightly onto the outer surface of the packing, forcing same tightly onto the spring.

A great many tests have shown that a spring protected by a packing and rubber sleeve as shown and described is protected against the action of moisture and dirt in the most perfect manner, so that the lubricant inserted between the single lamina of the spring is prevented from escaping and the spring is therefore permanently lubricated.

The advantage involved in the present invention is not confined to the protection from rust, but also to the infinite duration of this protection.

In the modification illustrated in the drawing the water- and air-tight envelopes extend from the ends towards the middle of the spring. At this point where the spring is fixed to the chassis, no protection need be provided inasmuch as in this point a relative displacement of the single lamina does not occur and the layer of lubricant placed between the single lamina will therefore not be removed or diluted.

We wish it to be understood that we do not desire to be limited to the exact details of construction shown and described for obvious modifications will occur to a person skilled in the art.

We claim:—

1. Vehicle spring protector comprising a layer of permanently deformable water-repelling material surrounding the spring and an elastic sleeve tightly surrounding said layer in an air- and water-tight manner.

2. Vehicle spring protector comprising a layer of permanently deformable water-repelling material surrounding the spring and a rubber sleeve tightly surrounding said layer in an air- and water-tight manner.

3. Vehicle spring protector comprising a layer of permanently deformable water-repelling material surrounding the spring, an air- and water-tight bandage wound around said layer and an elastic sleeve tightly surrounding said bandage.

4. Vehicle spring protector comprising a layer of a mass containing paraffine, a spring embedded in said mass and an elastic sleeve tightly surrounding said layer in an air- and water-tight manner.

In testimony whereof we affix our signatures.

VALERIE TAUFFENBACH, née WALLER.
CARL GREINER.